(12) United States Patent
Matsumura

(10) Patent No.: US 11,582,362 B2
(45) Date of Patent: Feb. 14, 2023

(54) IMAGE READING APPARATUS COMPRISING A PROCESSOR THAT DETECTS AN ABNORMAL PIXEL, AND OUTPUTS AN IMAGE OBTAINED BY A FIRST PROCESSING OR SECOND PROCESSING BASED ON IF CHARACTER RECOGNITION PROCESSING OF A CHARACTER OBTAINED BY FIRST PROCESSING IS THE SAME AS THE CHARACTER OBTAINED BY THE SECOND PROCESSING

(71) Applicant: CANON KABUSHIKI KAISHA, Tokyo (JP)

(72) Inventor: Koichi Matsumura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/681,643

(22) Filed: Feb. 25, 2022

(65) Prior Publication Data
US 2022/0294925 A1    Sep. 15, 2022

(30) Foreign Application Priority Data
Mar. 9, 2021   (JP) .............................. JP2021-036929

(51) Int. Cl.
*H04N 1/047*    (2006.01)
*H04N 1/00*    (2006.01)
(Continued)

(52) U.S. Cl.
CPC ............. *H04N 1/047* (2013.01); *G06V 30/14* (2022.01); *G06V 30/19* (2022.01);
(Continued)

(58) Field of Classification Search
CPC .... G06V 30/14; G06V 30/19; H04N 1/00005; H04N 1/00013; H04N 1/00037;
(Continued)

(56) References Cited

U.S. PATENT DOCUMENTS 10,129,415 B2 * 11/2018 Morikawa .............. H04N 1/193
10,356,269 B2    7/2019 Shimizu ............. H04N 1/00708
(Continued)

FOREIGN PATENT DOCUMENTS

JP    2001-285595    10/2001

OTHER PUBLICATIONS

U.S. Appl. No. 17/673,505, filed Feb. 16, 2022.
U.S. Appl. No. 17/673,541, filed Feb. 16, 2022.

*Primary Examiner* — Chad Dickerson
(74) *Attorney, Agent, or Firm* — Venable LLP

(57) ABSTRACT

An image reading apparatus includes a conveyance unit configured to convey an original; a reading unit comprising a reading sensor, the reading sensor having a light receiving element to receive light of a first color and a light receiving element to receive light of a second color that is different from the first color, wherein the reading unit is configured to read an image of the original conveyed by the conveyance unit by using the reading sensor to generate image data which represents a reading result of the reading unit; at least one processor configured to: determine a first abnormal position that is a position in a first direction of an abnormal pixel of the first color in an image represented by the image data.

5 Claims, 12 Drawing Sheets

(51) Int. Cl.
  *G06V 30/14*  (2022.01)
  *H04N 1/028*  (2006.01)
  *H04N 1/12*  (2006.01)
  *G06V 30/19*  (2022.01)

(52) U.S. Cl.
  CPC ..... *H04N 1/00005* (2013.01); *H04N 1/00013* (2013.01); *H04N 1/00037* (2013.01); *H04N 1/00082* (2013.01); *H04N 1/00594* (2013.01); *H04N 1/02815* (2013.01); *H04N 1/1215* (2013.01)

(58) Field of Classification Search
  CPC ........... H04N 1/00082; H04N 1/00594; H04N 1/02815; H04N 1/047; H04N 1/1215
  USPC ................. 358/1.11–1.18, 3.26, 3.31, 1.5
  See application file for complete search history.

(56) References Cited

U.S. PATENT DOCUMENTS

| | | | |
|---|---|---|---|
| 10,616,428 B2 | 4/2020 | Shimizu | H04N 1/00005 |
| 10,764,461 B2 | 9/2020 | Shimizu | H04N 1/00771 |
| 10,897,552 B2 | 1/2021 | Shimizu | H04N 1/00713 |
| 11,172,089 B2 | 11/2021 | Shimizu | H04N 1/00713 |
| 2003/0219170 A1* | 11/2003 | Ishido | H04N 1/193 348/246 |
| 2018/0176400 A1 | 6/2018 | Shimizu | H04N 1/00737 |
| 2022/0272206 A1* | 8/2022 | Shimizu | H04N 1/00023 |

\* cited by examiner

IMAGE READING APPARATUS COMPRISING A PROCESSOR THAT DETECTS AN ABNORMAL PIXEL, AND OUTPUTS AN IMAGE OBTAINED BY A FIRST PROCESSING OR SECOND PROCESSING BASED ON IF CHARACTER RECOGNITION PROCESSING OF A CHARACTER OBTAINED BY FIRST PROCESSING IS THE SAME AS THE CHARACTER OBTAINED BY THE SECOND PROCESSING

BACKGROUND OF THE INVENTION

Field of the Invention

The present disclosure relates to an image reading apparatus which reads an image of an original.

Description of the Related Art

An image reading apparatus having a configuration in which documents stacked on an original tray are read one by one by an auto document feeder (hereinafter referred to as "ADF") is known. Japanese Patent Application Laid-open No. 2001-285595 discloses such an image reading apparatus. In this image reading apparatus, the ADF conveys the document so as to pass over the platen arranged at a reading position of the image reading apparatus. The image reading apparatus irradiates the original passing over the platen with light from a light source, then, the image reading apparatus receives the reflected light by an image pickup element to convert it into an electrical signal to thereby read the image of the original.

Opportunities to read and digitize images of forms, such as invoices, using the image reading apparatus are increasing. In order to digitize many forms, there is an increasing demand for feeding forms using the ADF. When the original is fed using the ADF, dust (foreign matter), such as paper dust caused by the original itself or toner peeled off from the original, may adhere to the platen which is arranged at a reading position. When reading the image with the foreign matter on the platen, the irradiation light and the reflected light are blocked by the foreign matter. Thus, a vertical line (streak image) appears at a position of the foreign matter in an image (reading image). In many cases, the image reading apparatus has a streak image correcting function for erasing such streak images.

When the streak image overlaps with a character on the original, the character in the reading image may also be erased by the streak image correction. Especially when reading the image such as the form, erasing of the character is causes unfavorable results for the user. However, if the streak image correction is not performed at all, the streak image remains in the reading image, which makes it difficult for the user to recognize characters from the reading image. Therefore, in view of the above-mentioned problems, the present disclosure provides the image reading apparatus that appropriately corrects the streak image caused by the foreign matter on the reading position.

SUMMARY OF THE INVENTION

The image reading apparatus according to the present disclosure includes: a conveyance unit configured to convey an original; a reading unit comprising a reading sensor, the reading sensor having a light receiving element to receive light of a first color and a light receiving element to receive light of a second color that is different from the first color, wherein the reading unit is configured to read an image of the original conveyed by the conveyance unit by using the reading sensor to generate image data which represents a reading result of the reading unit; at least one processor configured to: determine a first abnormal position that is a position in a first direction of an abnormal pixel of the first color in an image represented by the image data, wherein, in the image represented by the image data, the first direction is a direction which intersects a second direction corresponding to a conveyance direction in which the original is conveyed; determine a second abnormal position that is a position in the first direction of an abnormal pixel of the second color in the image represented by the image data; perform correction processing for removing the streak image by correcting the image data; and perform character recognition processing to recognize a character in the image represented by the image data, wherein the at least one processor is configured to perform a first processing in which: the correction processing is performed to the image data of the first color corresponding to the first abnormal position in the image represented by the image data; and the correction processing is performed, regardless of presence or absence of the abnormal pixel of the second color, to the image data of the second color corresponding to the first abnormal position in the image represented by the image data, wherein the at least one processor is configured to perform a second processing in which: the correction processing is performed to the image data of the first color corresponding to the first abnormal position in the image represented by the image data; and the correction processing is not performed, in a case where the abnormal pixel of the second color is not in the first abnormal position, to the image data of the second color corresponding to the first abnormal position in the image represented by the image, and wherein the at least one processor is configured to: output the image obtained by the first processing in a case where the character recognized by the character recognition processing to the image obtained by the first processing and the character recognized by the character recognition processing to the image obtained by the second processing are the same, output the image obtained by the second processing in a case where the character recognized by the character recognition processing to the image obtained by the first processing and the character recognized by the character recognition processing to the image obtained by the second processing are different from each other.

Further features of the present invention will become apparent from the following description of exemplary embodiments (with reference to the attached drawings).

DESCRIPTION OF THE EMBODIMENTS

Figure 1:
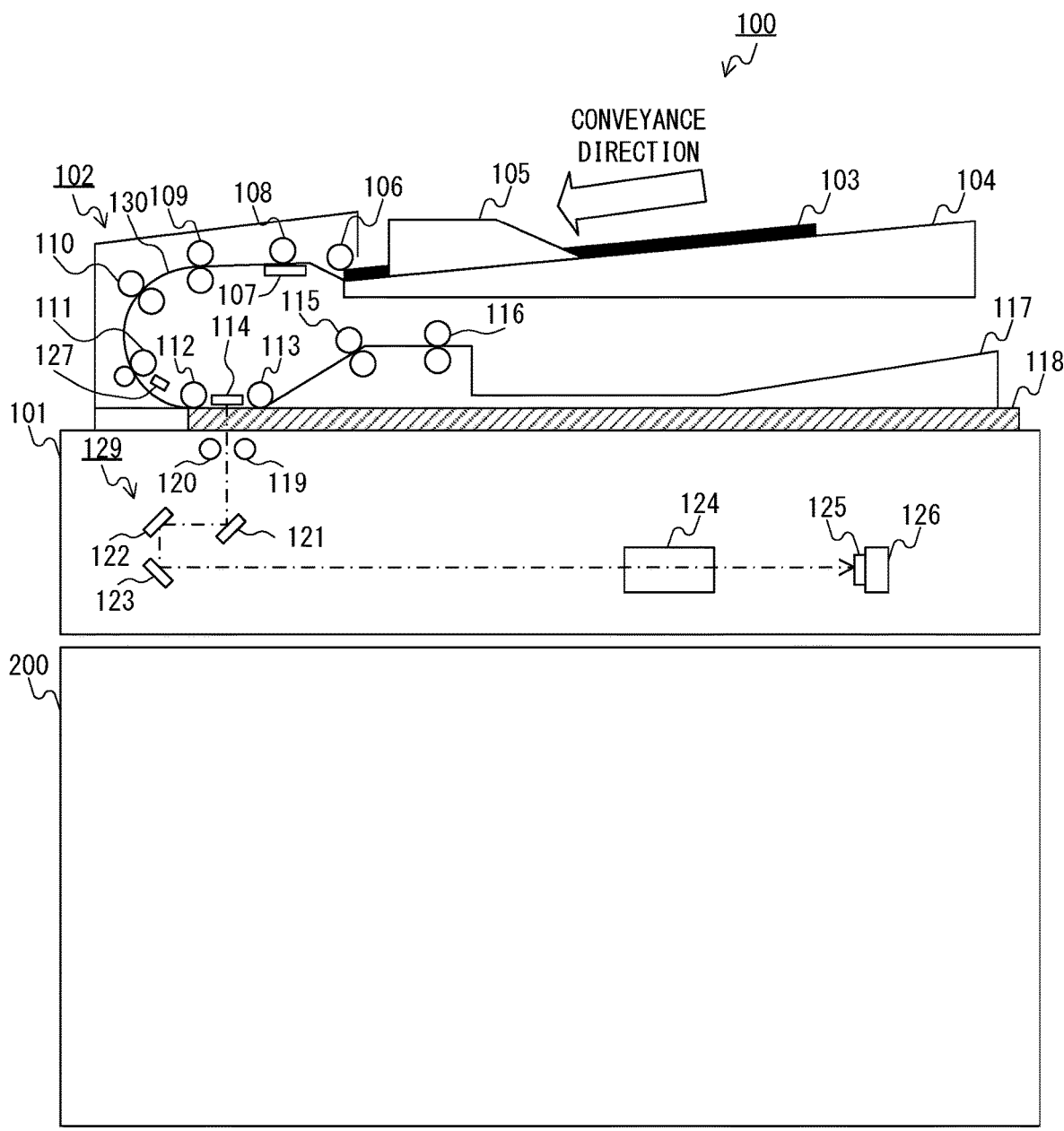
FIG. 1 is a configuration diagram of an image reading apparatus.

Hereinafter, embodiments for carrying out the present invention will be described with reference to the drawings.
<Configuration of Image Reading Apparatus>
FIG. 1 is a configuration explanatory diagram of an image reading apparatus of the present embodiment. The image reading apparatus 100 includes an image reading unit 101 and an ADF 102. The image reading apparatus 100 is provided on a printer 200 to print an image on a sheet. The image reading apparatus 100 forms a part of an image forming apparatus 1, such as a copier or a multifunction apparatus, which forms an image on a sheet. The ADF 102 is arranged on an upper part of the image reading unit 101. A platen 118 is provided on an ADF 102 side surface of the image reading unit 101. The ADF 102 is provided to be openable and closable with respect to the platen 118.

The ADF 102 includes an original tray 104 on which an original bundle, which consists of one or more originals 103, is placed, a conveyance path 130, and a discharge tray 117. The original 103 is conveyed one by one from the original tray 104 to the conveyance path 130, and is discharged to the discharge tray 117. The original 103 is read by the image reading unit 101 while it is conveyed along the conveyance path 130. At a base end of the original tray 104, a pickup roller 106 for feeding the original 103 from the original bundle to the conveyance path 130 is arranged. In the original tray 104, a pair of width regulating plates 105 are arranged at both ends in a direction (width direction) orthogonal to the conveyance direction of the original 103. The pair of width regulating plates 105 regulates ends of the width direction of the original bundle.

A separation roller 108 and a separation pad 107 are provided along the conveyance path 130 on a downstream side of the conveyance direction of the original 103 with respect to the pickup roller 106. The separation roller 108 and the separation pad 107 are arranged to face each other across the conveyance path 130. The separation roller 108 cooperates with the separation pad 107 to separate the original 103 fed from the original tray 104, from the top of the original bundle, to the conveyance path 130 by the pickup roller 106 one by one.

Along the conveyance path 130 on the downstream side of the conveyance direction of the original 103 with respect to the separation roller 108, first and second registration rollers 109 and 110, first to fourth conveyance rollers 111, 112, 113, and 115, and a discharge roller 116 are arranged. An original detection sensor 127 is arranged between the first conveyance roller 111 and the second conveyance roller 112. The details of the original detection sensor 127 will be described later. The second conveyance roller 112 and the third conveyance roller 113 are positioned such that a space between them is positioned above an upper surface of the platen 118 of the image reading unit 101. The space is a reading position of the image reading unit 101. A white guide member 114 is arranged at a position facing the platen 118 across the conveyance path 130.

A reading unit 129 is provided in a housing of the image reading unit 101. The reading unit 129 includes lamps 119 and 120 as light sources, reflection mirrors 121, 122 and 123, an imaging lens 124, and a color line sensor 125. The reflection mirrors 122 and 123 are arranged to face the reflection mirror 121. The imaging lens 124 and the color line sensor 125 are arranged to face the reflection mirrors 122 and 123. A signal processing board 126 is electrically connected to the color line sensor 125.

In the image reading apparatus 100 having the above configuration, the original bundle placed on the original tray 104 of the ADF 102 is regulated in the width direction by the width regulating plate 105 to thereby prevent the original 103 from being conveyed diagonally. The pickup roller 106 picks up the original 103 from the original bundle to feed it to the conveyance path 130. The separation pad 107 and the separation roller 108 cooperate to separate and convey the original 103 one by one from the top of the original bundle.

The first registration roller 109 corrects the skew of the original P, which is separated into one and is conveyed by the separation roller 108. The original 103 to which the skew correction has been performed is conveyed to the reading position by the second registration roller 110, the first conveyance roller 111, and the second conveyance roller 112. The original 103 is conveyed between the platen 118 and the white guide member 114 at the reading position. The white guide member 114 presses the original 103 toward the platen 118 so that the original 103 passes through the ADF reading position while maintaining contact with the platen 118. Further, the white guide member 114 is read by the reading unit 129 when the original 103 is not present at the reading position. Based on the reading result of reading the white guide member 114, it is determined whether or not a foreign matter such as dust or the like is adhering to the reading position. Moreover, the white guide member 114 is used also for a shading correction.

The reading unit 129 performs a reading operation for the original 103 passing through the reading position as follows. Start timing of the reading operation of the original 103 by the reading unit 129 is controlled according to the detection timing of the original 103 along the conveyance path 130 by the original detection sensor 127.

The lamps 119 and 120 of the reading unit 129 irradiate the original 103 passing through the reading position with light. The reflection mirrors 121, 122 and 123 reflect the light reflected by the original 103 toward the imaging lens 124. The imaging lens 124 forms an image of the reflected light on a light receiving surface of the color line sensor 125. the color line sensor 125 is equipped with two or more image pickup elements, such as CCD sensors or CMOS sensors. The reflected light forms an image on the light receiving surface of the image sensor. The color line sensor 125 converts the received reflected light into an electrical signal and transmits it to the signal processing board 126. The direction in which the plurality of image pickup elements are arranged is a main scanning direction, and is orthogonal to the conveyance direction of the original 103. The conveyance direction of the original 103 is a sub-scanning direction.

The signal processing board 126 performs predetermined processing on the electrical signal obtained from the color line sensor 125 and generates image data, which is a reading result of the original 103. The image data is a digital signal. The image data is transmitted to a printer 200 from the image reading apparatus 100. In the case of copying processing, the printer 200 forms an image on the sheet based on the image data.

The original 103 to which reading processing is performed at the reading position is conveyed to the third conveyance roller 113 by the second conveyance roller 112. The original 103 is conveyed through the third conveyance roller 113, the fourth conveyance roller 115, and the discharge roller 116 in this order, and the original 103 is discharged to the discharge tray 117.

Manufacturing variations occur in the color line sensor for each image pickup element (for each pixel). Further, it is not easy to make the irradiation light emitted from the lamps 119 and 120 uniform in the main scanning direction. Therefore, even in a case where an image is read from the original 103 on which an image has been formed with a uniform image density, the digital value of the image data, which is a reading result, may vary depending on a position in the main scanning direction.

Shading correction is performed to suppress such variations. Specifically, the reading unit 129 reads the white guide member 114. The white guide member 114 has a uniform white surface that is read by the reading unit 129. From a reading result of the white guide member 114, a correction value is calculated so that the reading result (for example, a luminance value) in the main scanning direction becomes the same predetermined value. With this correction value, the irradiation amounts of the lamps 119 and 120, the sensitivity variation of the image pickup element, and the reading result of the image of the original 103 are corrected, thus, the variation in manufacturing and the variation in the amount of light are corrected.

The reading unit 129 can also read an image of the original which is manually placed on the platen 118 by the user. In this case, the lamps 119 and 120 of the reading unit 129 and the reflection mirror 121 read the original line by line while moving in the sub-scanning direction.

Figure 2:
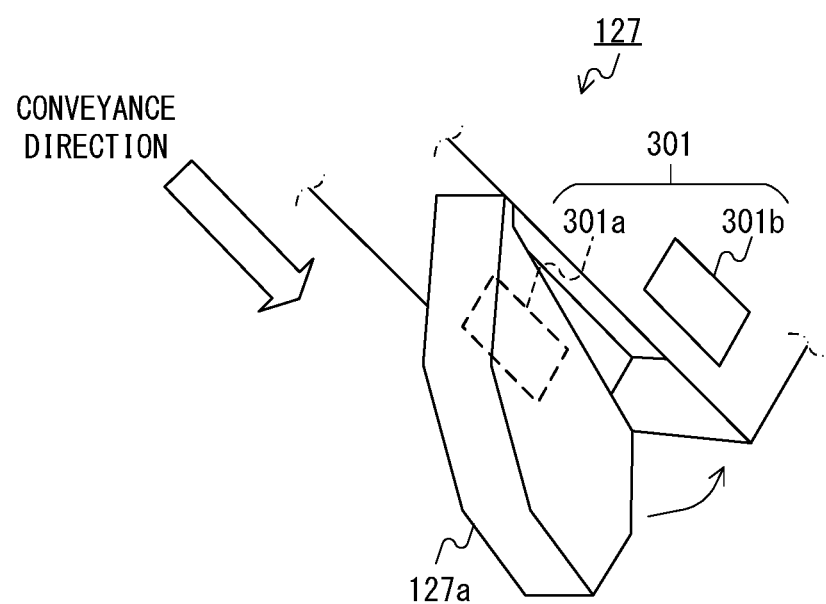
FIG. 2 is an explanatory diagram of an original detection sensor.

FIG. 2 is an explanatory diagram of an original detection sensor 127. The original detection sensor 127 includes an actuator 127a and a transmissive sensor 301. The transmissive sensor 301 includes an irradiation unit 301a and a light receiving unit 301b.

The actuator 127a collapses in the conveyance direction of the original 103 when the original 103 is conveyed along the conveyance path 130 to thereby collide against the actuator 127a. The actuator 127a blocks, by collapsing in the conveyance direction of the original 103, an optical path between the irradiation unit 301a and the light receiving unit 301b of the transmissive sensor 301. By blocking the optical path between the irradiation unit 301a and the light receiving unit 301b, (for example, the amount of infrared light) the amount of light received by the light receiving unit 301b from the irradiation unit 301a will be changed. The amount of light received by the light receiving unit 301b is converted into an electrical signal. The change in the amount of light received by the light receiving unit 301b corresponds to a change in the level of the electrical signal. From the change of the electrical signal level, it is detected that the original 103 has reached the detection position of the original detection sensor 127.

<Controller>

Figure 3:
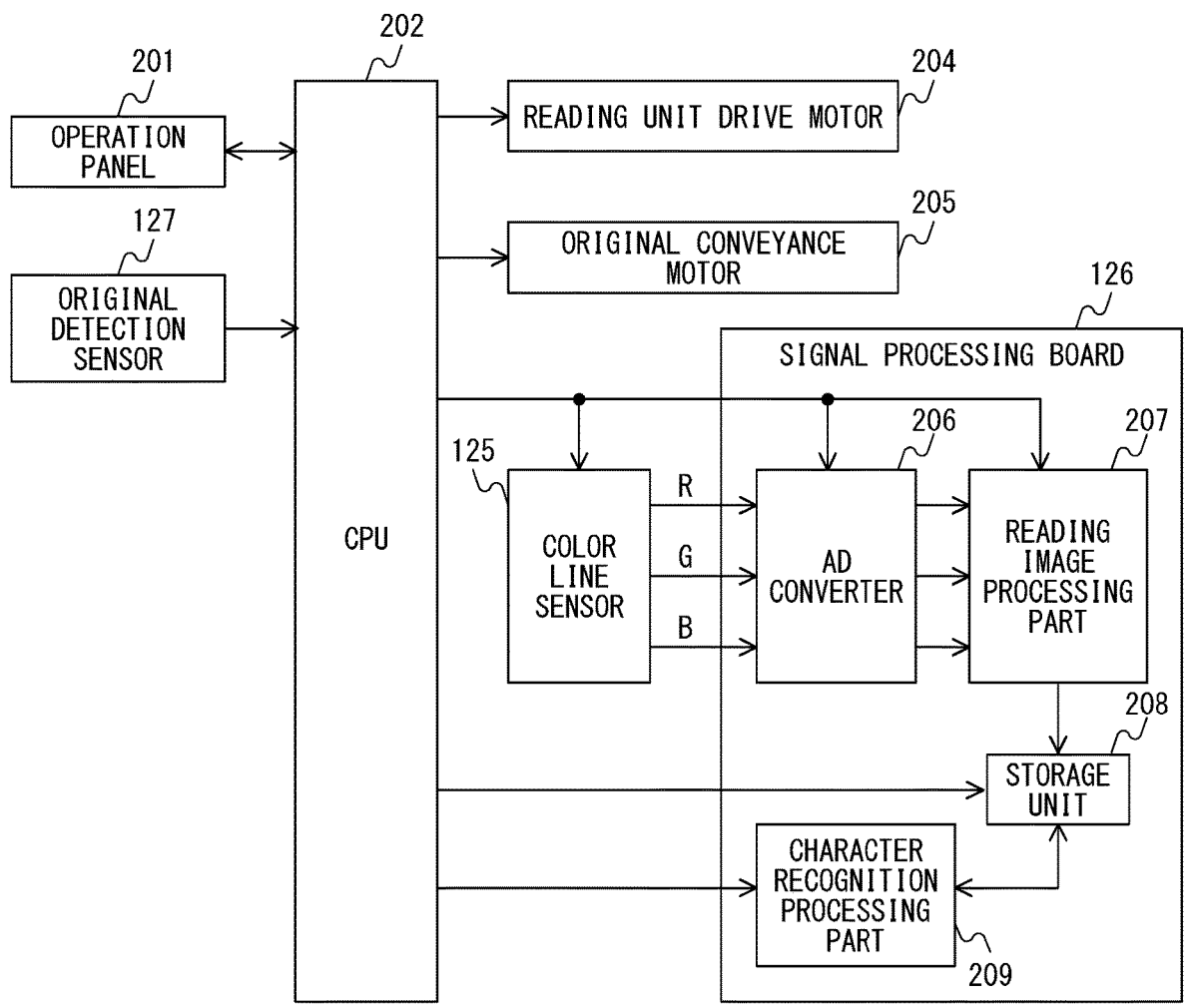
FIG. 3 is an exemplary diagram of a controller.

FIG. 3 is an explanatory diagram of a controller which controls an operation of the image reading apparatus 100. The controller is built in the image reading apparatus 100. In the present embodiment, the controller is comprised of a CPU (Central Processing Unit) 202, however, a semiconductor device such as an MPU or an ASIC may be used. The CPU 202 controls the whole operation of the image reading apparatus 100 by executing a predetermined computer program.

The CPU 202 is in connection with an operation panel 201, the original detection sensor 127, a reading unit drive motor 204, an original conveyance motor 205, the color line sensor 125, an AD converter 206, a reading image processing part 207, a storage unit 208, and a character recognition processing part 209. The AD converter 206, the reading image processing part 207, the storage unit 208, and the character recognition processing part 209 are mounted on the signal processing board 126. The CPU 202 can determine that the original 103 has reached the detection position of the original detection sensor 127 based on the change in the level of the electrical signal output from the original detection sensor 127, as described above.

The operation panel 201 is a user interface including an input interface and an output interface. The input interface includes key buttons, a touch panel, and the like. The output interface includes a display, a speaker, and the like. The CPU 202 controls the operation of the image reading apparatus 100 in response to an instruction or the like input from the input interface of the operation panel 201. The CPU 202 outputs information such as the status of the image reading apparatus 100 from the output interface of the operation panel 201. For example, the CPU 202 displays the setting screen on the display when setting the reading conditions and the like to thereby accept the operation contents such as settings by the input interface.

The reading unit drive motor 204 is a drive source for moving the reading unit 129 in the sub-scanning direction under the control of the CPU 202. When reading an image from the original 103 placed on the platen 118, the CPU 202 moves the reading unit 129 in the sub-scanning direction by the reading unit drive motor 204.

The original conveyance motor 205 is a drive source for rotationally driving various rollers arranged along the conveyance path 130. When the ADF 102 is used to read the image of the original 103, the CPU 202 controls the original conveyance motor 205 to feed the original 103 from the original tray 104.

The CPU 202 controls the operation of the color line sensor 125. The color line sensor 125 converts the received reflected light into an electrical signal and outputs it. The color line sensor 125 includes a plurality of line sensors to receive reflected light of a plurality of colors to read an image in a plurality of colors. In the present embodiment, to receive the reflected light of three colors of R (red), G (green), and B (blue), the color line sensor 125 includes three line sensors each corresponding to respective color. The electrical signal output from the color line sensor 125 is an analog voltage of each color corresponding to R, G, and B.

The AD converter 206 obtains the analog voltage of each color from the color line sensor 125. The AD converter 206 converts the obtained analog voltage of each color into reading data which is a digital value. Each reading data converted from the analog voltage of each color by the AD converter 206 is transmitted to the reading image processing part 207. The reading image processing part 207 performs predetermined processing on the reading data of each color to generate image data representing the read image. The reading image processing part 207 stores the image data generated by reading the original 103 in the storage unit 208. The image data generated by reading the original 103 may be directly transmitted to the printer 200 or another external device. The character recognition processing part 209 performs character recognition processing to the image data stored in the storage unit 208 and stores a character recognition result in the storage unit 208. The character recognition processing part 209 determines a final output image data based on the character recognition result.

Although not shown, the printer 200 is also equipped with a controller for controlling the operation. The controller of the printer 200 can communicate with the CPU 202 of the image reading apparatus 100. The operation panel 201 is connected to the controller of the printer 200. The CPU 202 of the image reading apparatus 100 obtains the instruction input from the operation panel 201 via the controller of the printer 200. For example, an instruction for copying processing is input from the operation panel 201 to the controller of the printer 200. When the controller of the printer 200 obtains the copy processing instruction from the operation panel 201, the controller instructs the CPU 202 to perform the copying processing. According to this instruction, the CPU 202 operates during the above copying processing.

<Reading Image Processing Part>

Figure 4:
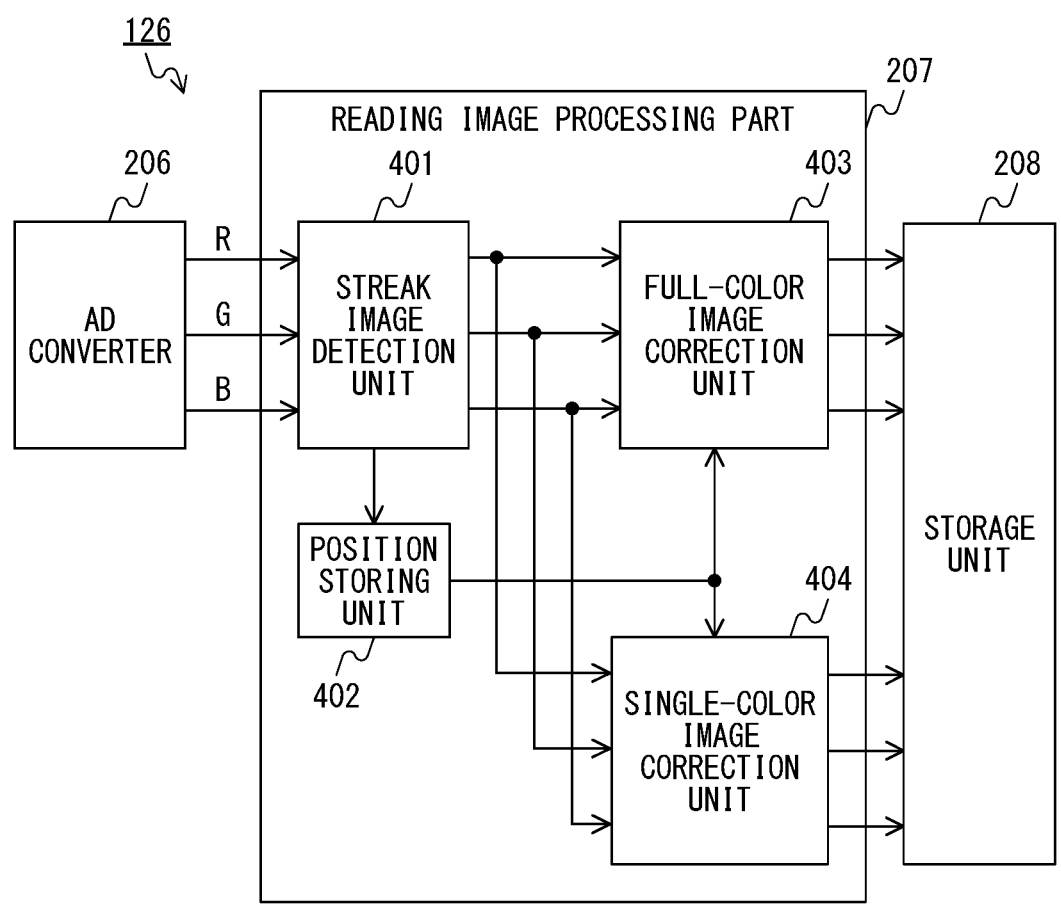
FIG. 4 is a configuration diagram of a reading image processing part.

FIG. 4 is an explanatory configuration view of the reading image processing part 207. The reading image processing part 207 includes a streak image detection unit 401, a position storing unit 402, a full-color image correction unit 403, and a single-color image correction unit 404. In the following, a process, performed by the reading image processing part 207, of erasing the streak image generated by the dust at the ADF reading position on the platen 118 is described. The reading image processing part 207 may have a function of performing another processing on the reading image.

The streak image detection unit 401 obtains reading data of each color converted from the analog voltage of each color by the AD converter 206. Based on the reading data of each color obtained by reading the white guide member 114 by the color line sensor 125, the streak image detection unit 401 detects a position of the streak image generated by the dust adhering to the platen 118. Here, the position of the streak image corresponds to the position (pixel) in the main scanning direction at the ADF reading position on the platen 118. Hereinafter, the pixel corresponding to the position of the streak image in the main scanning direction is referred to as "abnormal pixel".

Figure 5A:
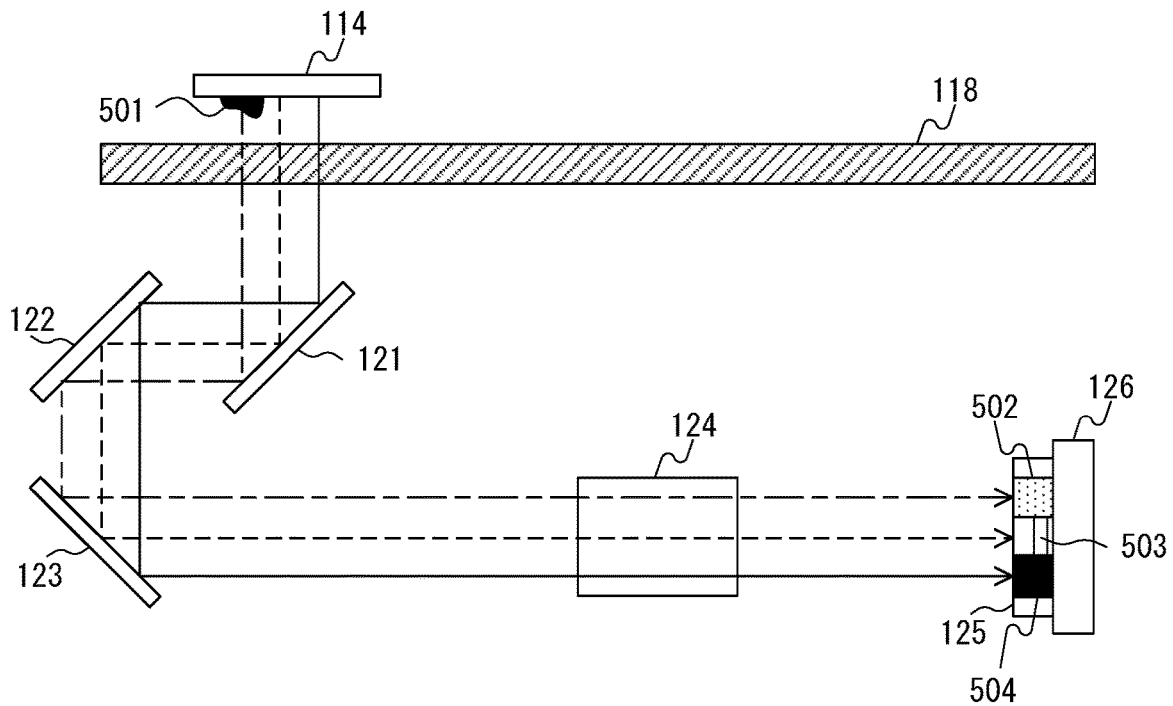
FIG. 5A and FIG. 5B are exemplary diagrams representing a relationship between a dust and a color line sensor.
Figure 5B:
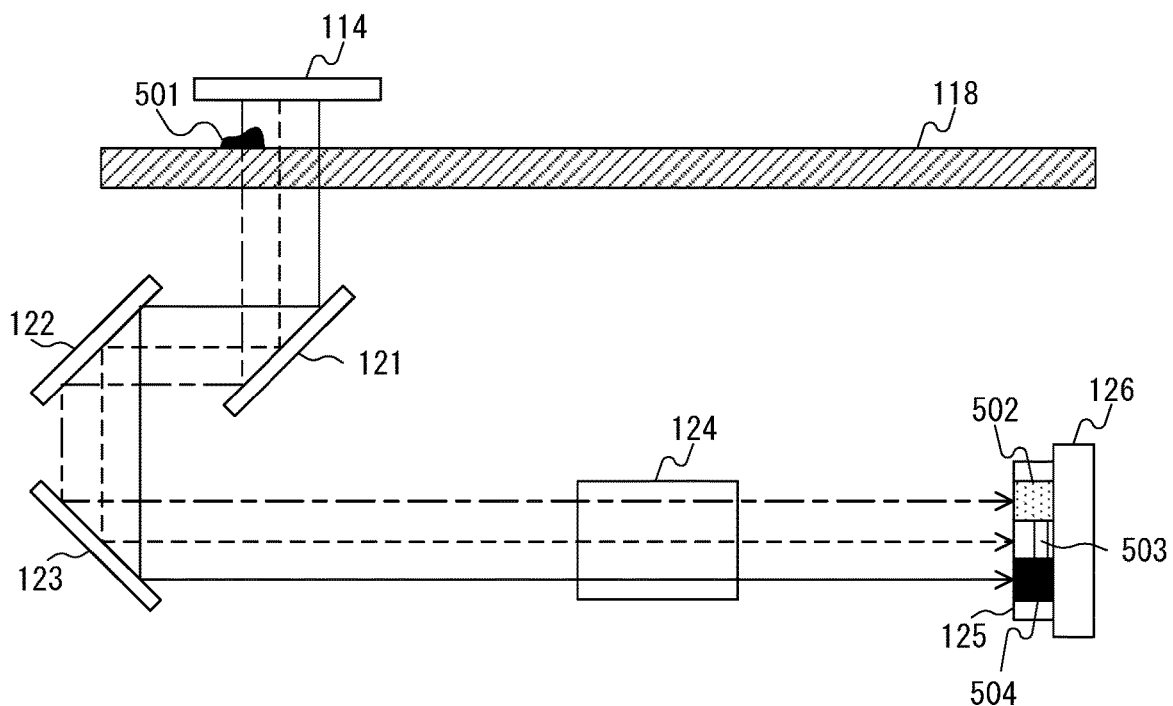

FIGS. 5A and 5B are explanatory views of a relationship between the dust (foreign matter) at the reading position and the color line sensor 125. The color line sensor 125 of the present embodiment includes three line sensors (R sensor 502, G sensor 503, and B sensor 504) provided for each color to receive the reflected light for each of the three colors. The R sensor 502 includes a filter that transmits a red component of the reflected light to receive the red light. The G sensor 503 includes a filter that transmits a green component of the reflected light to receive the green light. The B sensor 502 includes a filter that transmits a blue component of the reflected light to receive the blue light. The R sensor 502, the G sensor 503, and the B sensor 504 are the line sensors in which a plurality of the image pickup elements are arranged in the main scanning direction, respectively.

The reflected light reflected by the white guide member 114 or the original 103 forms an image on a light receiving surface of the line sensor (R sensor 502, G sensor 503, and B sensor 504) of each color by the imaging lens 124 through the reflection mirrors 121, 122, and 123. In FIG. 5A and FIG. 5B, a dust 501 is at a reading position of the R sensor 502 and is not at a reading position of the G sensor 503 or the B sensor 504. In FIG. 5A, the dust 501 is on the white guide member 114. In FIG. 5B, the dust 501 is on the platen 118. The optical path of the reflected light received by the R sensor 502 is shown by a dot-dash line, the optical path of the reflected light received by the G sensor 503 is shown by a broken line, and the optical path of the reflected light received by the B sensor 504 is shown by a solid line.

Hereinafter, a detection method of the position of the abnormal pixel is explained. First, the output of the color line sensor 125 when the color line sensor 125 reads the white guide member 114 will be described.

Figure 6:
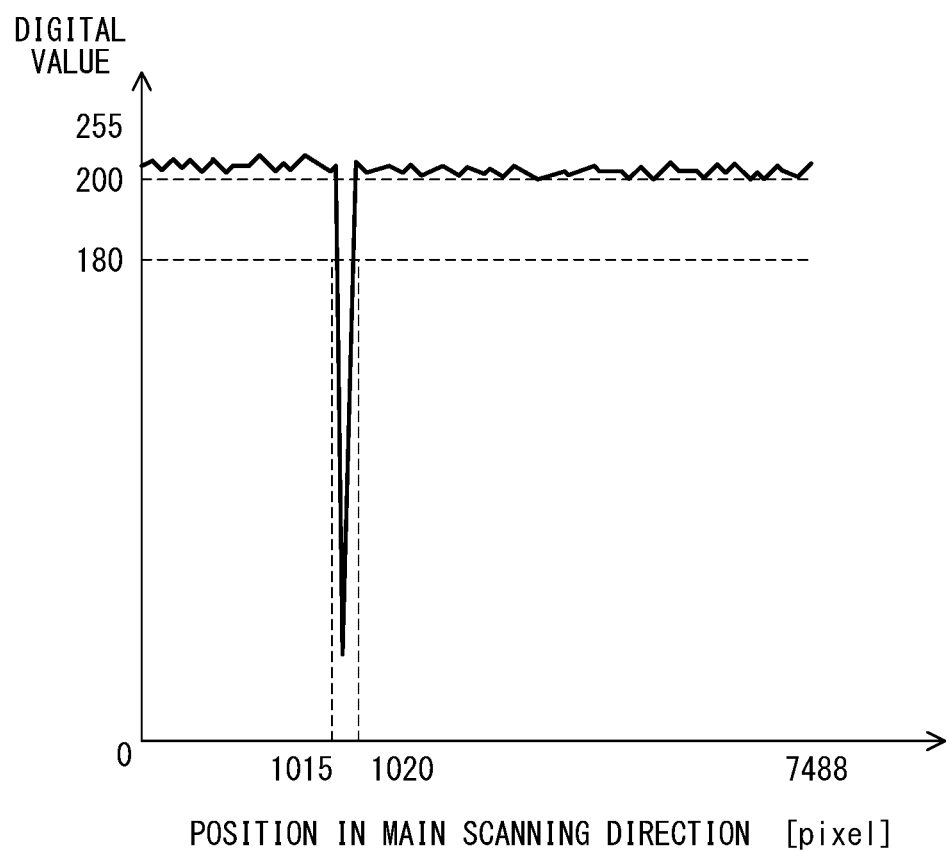
FIG. 6 is an exemplary diagram of a digital value of each position in the main scanning direction when there is a dust.

FIG. 6 is an exemplary diagram of the reading data (digital value) at each position in the main scanning direction based on the reading result output from the color line sensor 125 when the dust 501 is on the reading position. In FIG. 6, a horizontal axis indicates each position in the main scanning direction, and a vertical axis indicates the reading data (digital value). When the AD converter 206 outputs an 8-bit digital value, the reading data when the analog voltage output from the color line sensor 125 is AD-converted is in a range of 0 to 255.

When the white guide member 114 is read after shading correction, the reading data is almost the same in the main scanning direction. However, for example, as shown in FIG. 5A, when the dust 501 is on the white guide member 114, the light emitted to the white guide member 114 is blocked by the dust 501 at the position where the dust 501 is located. Therefore, the reading data at this position is smaller than the other positions. The streak image detection unit 401 compares the reading data for each position in the main scanning direction when the white guide member 114 is read with a predetermined threshold value. As a result of the comparison, the streak image detection unit 401 determines a pixel corresponding to a position where the reading data is smaller than a predetermined threshold value as a candidate for an abnormal pixel (abnormal pixel candidate).

Further, as shown in FIG. 5B, when the dust 501 is on the platen 118, the light emitted to the white guide member 114 is blocked by the dust 501 at the position where the dust 501 is located. Therefore, the reading data at this position is smaller than the other positions. The streak image detection unit 401 compares the reading data for each position in the main scanning direction when the white guide member 114 is read with a predetermined threshold value. As a result of the comparison, the streak image detection unit 401 determines a pixel corresponding to a position where the digital value is smaller than a predetermined threshold value as a candidate for an abnormal pixel (abnormal pixel candidate).

In the example of FIG. 6, the reading data when the white guide member 114 is read is about 200. Therefore, for example, when the threshold value is set to "180", a pixel having the reading data lower than "180" can be determined as an abnormal pixel candidate. In the example of FIG. 6, the pixels at the positions 1015 to 1020 in the main scanning direction are determined to be abnormal pixel candidates.

Next, the output of the color line sensor 125 when the image of the original 103 passing through the reading position 502 is read by the color line sensor 125 will be described.

As shown in FIG. 5A, when the dust 501 is on the white guide member 114 and the original 103 passes over the platen 118, the dust 501 is hidden by the original 103 when viewed from the color line sensor 125. As a result, the streak image caused by the dust 501 does not appear in the image representing the reading result of the original 103. That is, the values at the positions 1015 to 1020 in the main scanning direction in FIG. 6 do not become smaller than the predetermined threshold value due to the dust 501.

As shown in FIG. 5B, when the dust 501 is on the platen 118 in the ADF reading position and the original P passes over the platen 118, the original P is hidden by the dust 501 when viewed from the color line sensor 125. As a result, the streak image caused by the dust 501 appears in the image representing the reading result of the original 103. That is, the values at the positions 1015 to 1020 in the main scanning direction in FIG. 6 do not become smaller than the predetermined threshold value due to the dust 501. The streak image detection unit 401 determines the pixel corresponding to the position where the reading data is smaller than the predetermined threshold value as the candidate for the abnormal pixel (abnormal pixel candidate).

The streak image detection unit 401 determines the abnormal pixel based on the reading data obtained during a period of time from the start of reading until the image of a predetermined length is read from the tip of the original 103. If the abnormal pixel candidates continuously appear in the sub-scanning direction at the same position in the main scanning direction in the reading data of the period, the streak image detection unit 401 determines, among the abnormal pixel candidate, the pixel at the position in the main scanning direction as the abnormal pixel. That is, if the streak image appears continuously before and after the original 103 reaches the reading position, the streak image detection unit 401 determines, in the streak image, the pixel at the position in the main scanning direction as the abnormal pixel. The streak image detection unit 401 generates information for each color (red streak image information, green streak image information, and blue streak image information) which indicates the position of the abnormal pixel. Then, the streak image detection unit 401 stores the same in the position storing unit 402.

The streak image information (position information) stored in the position storing unit 402 is read by the full-color image correction unit 403 and the single-color image correction unit 404. The full-color image correction unit 403 and the single-color image correction unit 404 performs, based on information obtained from the position storing unit 402, linear interpolation of the read data corresponding to the position of the streak image (the target pixel) to thereby correct (remove) the streak image caused by the foreign matter. The reading image processing part 207 stores image data obtained by correcting the reading data in the storage unit 208. A method of detecting the abnormal pixel is not limited to the method described above, but can be any known method.

Figure 7:
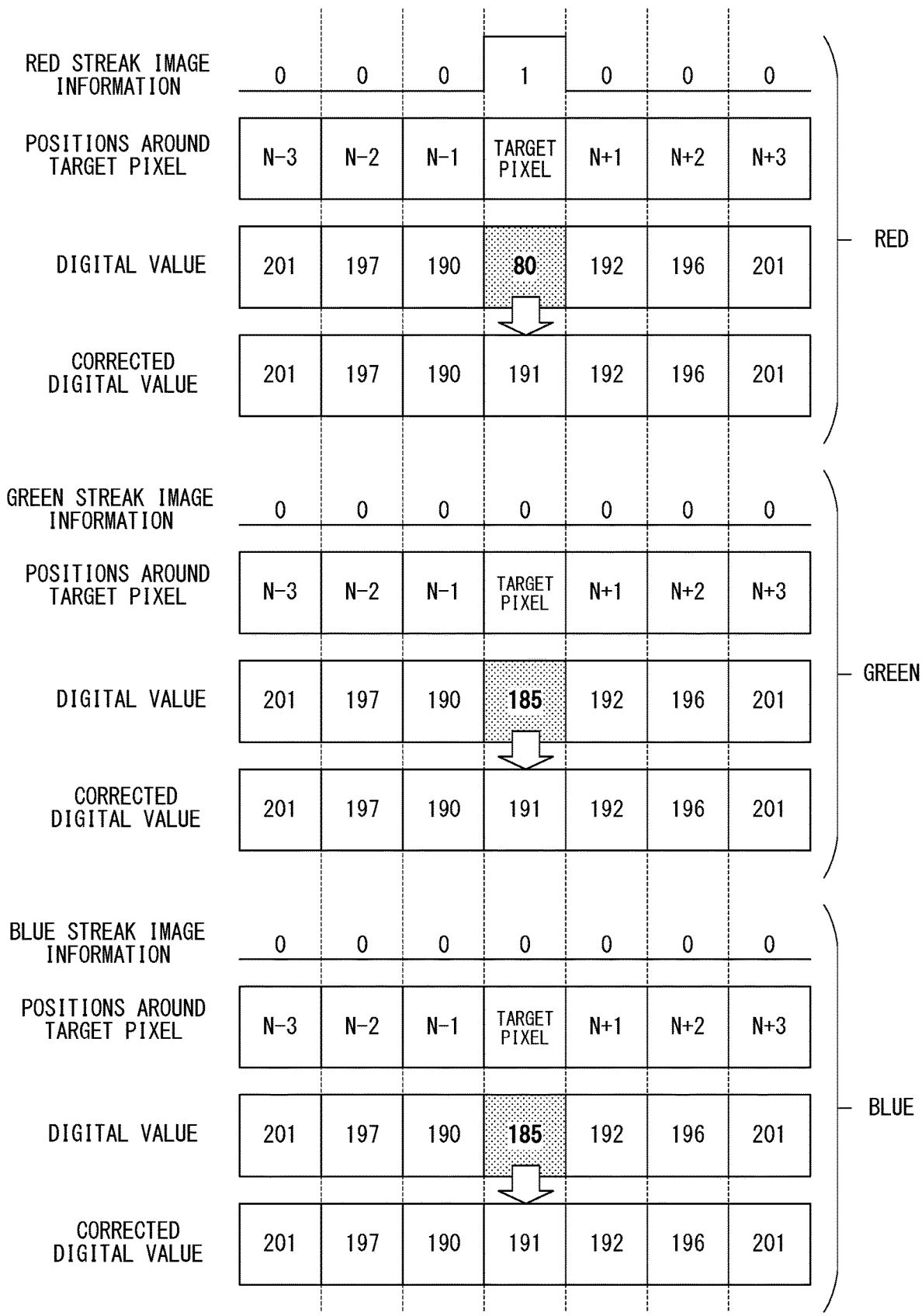
FIG. 7 is an explanatory diagram representing image processing performed by a full-color image correction part.

FIG. 7 is an explanatory diagram of image processing of the full-color image correction unit 403. The position storing unit 402 stores the full-color streak image information (red streak image information, green streak image information, and blue streak image information). In the full-color streak image information, as to each of the R sensor 502, G sensor 503, and B sensor 504, "1" is set for the position in the main scanning direction (position of an abnormal pixel) at which it is determined that the streak image has occurred. Further, "0" is set for the position in the main scanning direction at which it is determined that the streak image has not occurred. Due to the full-color streak image information, it is possible to know which position in the main scanning direction the streak image occurs. The streak image correction is performed based on the streak image information.

In the red streak image information in FIG. 7, the value of the target pixel (target position) is "1", which indicates that the streak image has occurred at the target pixel. As to the positions N−3, N−2, N−1, N+1, N+2, and N+3 around the target pixel in the main scanning direction, the red streak image information is "0". This indicates that the streak image has not occurred. The reading data of red color of the target pixel is "80", which is smaller than the reading data of the pixel which is at a position around the target pixel.

The full-color image correction unit 403 first identifies the position of the streak image (abnormal pixel) based on the red streak image information obtained from the position storing unit 402. Next, the full-color image correction unit 403 refers to the reading data of the position adjacent to the specified position of the streak image in the main scanning direction to interpolate the digital value of the position of the streak image linearly. By performing the linear interpolation, the streak image is removed.

In the example of R sensor 502, both the position N−1 and the position N+1 are adjacent to the target pixel at which the streak image has occurred. The reading data of position N−1 is "190", and the reading data of position N−1 is "192". Assuming that the reading data of the target pixel is D [N], the reading data of the adjacent pixels are D [N−1] and D [N+1], and the corrected (after linear interpolation) reading data of the target pixel is D [N]', the reading data D [N]' is expressed by the formula (1).

$$D[N]'=D[N-1]+(D[N+1]-D[N-1])/2 \quad (1)$$

$$D[N]'=190+(192-190)/2=191$$

Therefore, the reading data D [N]' of the target pixel after linear interpolation is "191". By converting the reading data "80" of the target pixel before correction to "191" as described above, the streak image correction is completed.

The full-color image correction unit 403 performs the streak image correction processing at the position (pixel) in the main scanning direction at which the streak image has occurred as described above. Even in a case where the abnormal pixel (the streak image) is detected only at the reading position of the R sensor 502, the full-color image correction unit 403 performs the same streak image correction processing on the reading data of the same position (pixel) in the main scanning direction obtained from the reading results of the G sensor 503 and the B sensor 504. As a result, the reading data "185" of the target pixel in the green streak image information is corrected to "191". The reading data "185" of the target pixel in the blue streak image information is corrected to "191".

The single-color image correction unit 404 selects, based on the full-color streak image information obtained from the position storing unit 402, a color to which the streak image correction is performed. When the streak image occurs only in the ADF reading position of the R sensor 502 as shown in FIG. 7, the reading data of the red color becomes a smaller value. Therefore, the streak image of the green component and the blue component is formed in the read image. The single-color image correction unit 404 corrects only for the color for which the streak image is detected. The correction is performed by the linear interpolation as in the full-color image correction unit 403.

Figure 8:
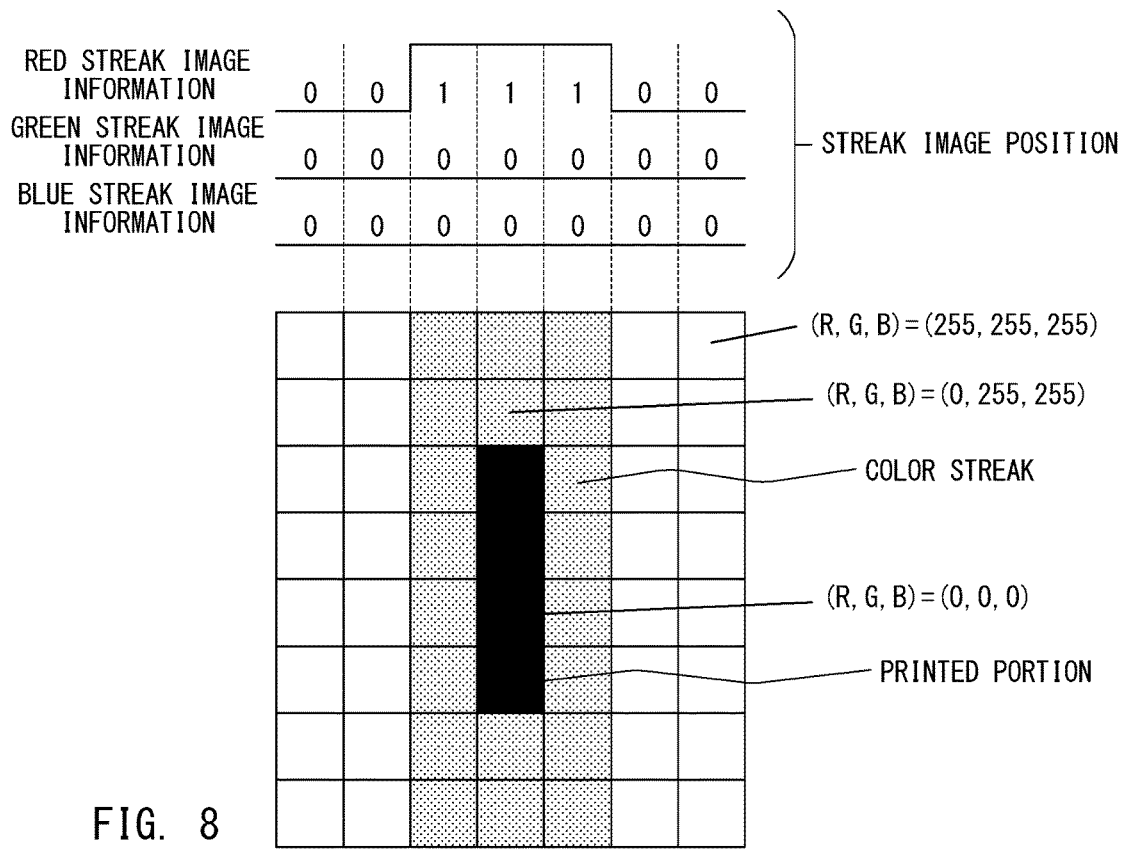
FIG. 8 is an explanatory diagram of a reading image before correction.
Figure 9:
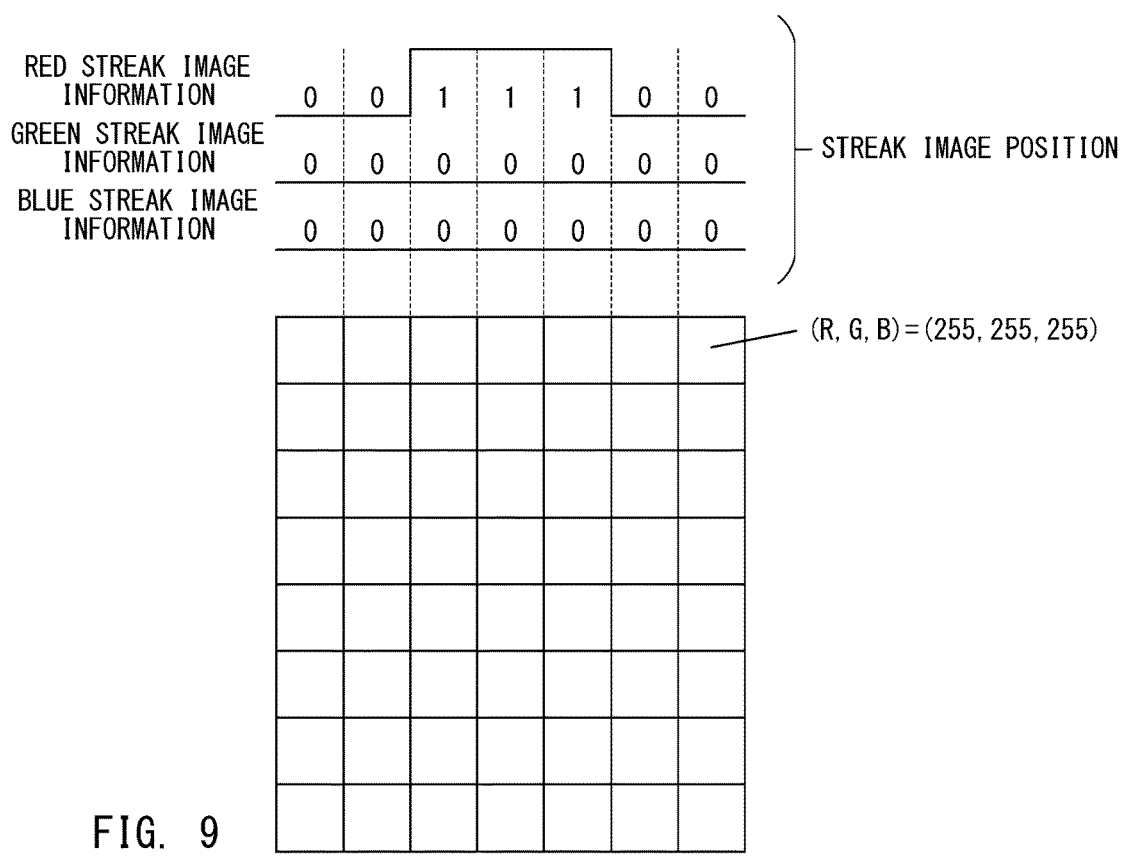
FIG. 9 is an explanatory diagram of the reading image after a full-color streak image correction.
Figure 10:
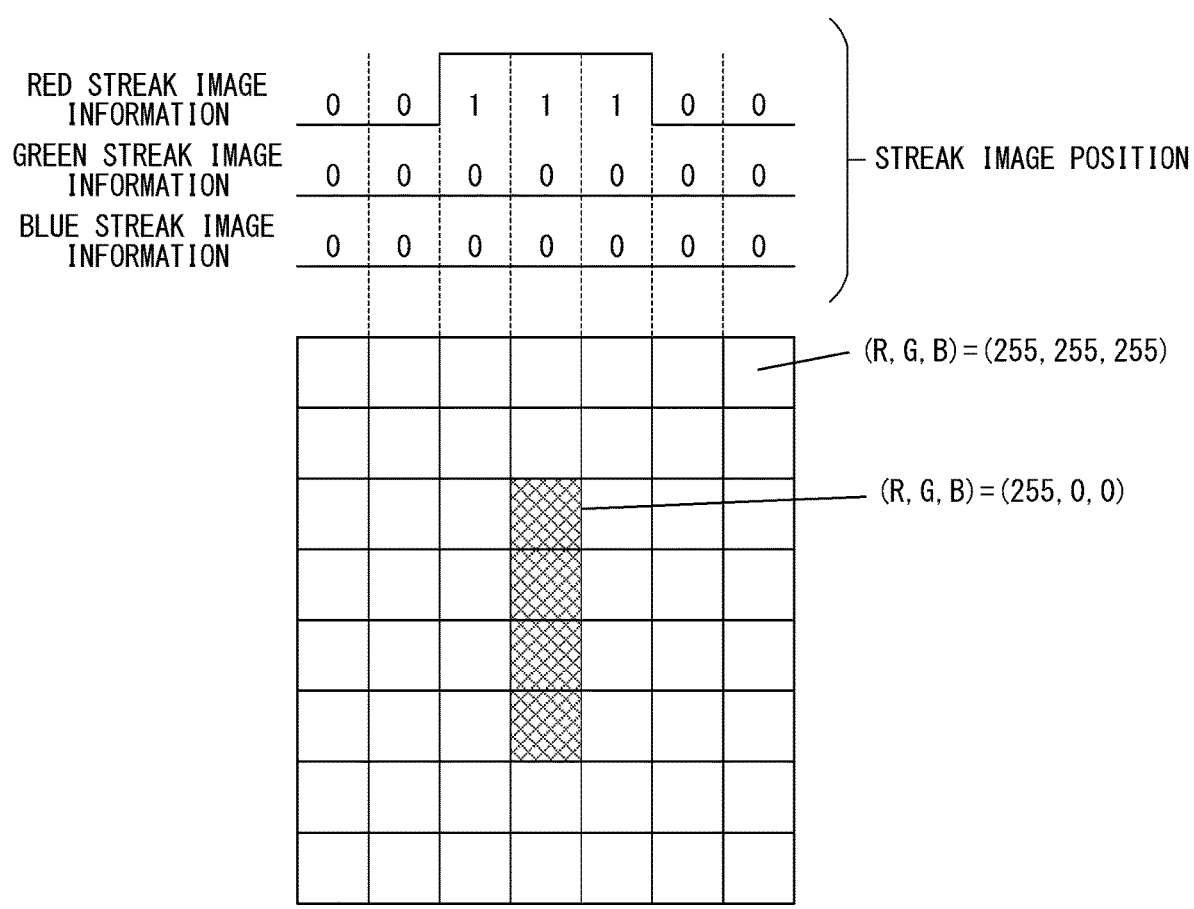
FIG. 10 is an explanatory diagram of the reading image after a single-color streak image correction.

The difference after the corrections between the full-color streak image correction and the single-color streak image correction will be described with reference to FIGS. 8 to 10. FIG. 8 shows a state before the correction. FIG. 9 shows a state after correction by the full-color image correction unit 403. FIG. 10 shows a state after correction by the single-color image correction unit 404.

FIG. 8 shows an example of the reading image when the dust is on the reading position of the R sensor 502. The reading data of the printed portion is black (R, G, B)=(0,0,0). Since the reading data of the red color becomes smaller due to the dust, the streak image (color streak) (R, G, B)=(0, 255,255) has occurred.

The full-color image correction unit 403 performs the streak image correction for each color component of full-color (R, G, B). When the full-color image correction unit 403 performs the streak image correction based on the equation (1) for the full-color streak image information as shown in FIG. 8, the result shown in FIG. 9 is obtained. That is, the streak image (color streak) of (R, G, B)=(0, 255, 255) and the printed portion of (R, G, B)=(0, 0, 0) are corrected, and the reading data of each position becomes (R, G, B)=(255, 255, 255). In this way, the printed portion may be erased by performing the streak image correction of the full-color in a case where the streak image overlaps the printed portion.

The single-color image correction unit 404 performs the streak image correction only for the red color for which the streak image is detected. When the single-color image correction unit 404 performs the streak image correction based on the formula (1) for the red streak image information as shown in FIG. 8, the result shown in FIG. 10 is obtained. That is, the streak image (color streak) of (R, G, B)=(0, 255, 255) is removed, however, the printed portion becomes (R, G, B)=(255, 0, 0). In this way, by performing the single-color streak image correction, the color of the printed portion changes and the printed portion becomes chromatic color, however, the printed portion is not erased in a case where the streak image overlaps the printed portion.

The reading image processing part 207 stores the two reading data after correcting the streak image as described above as image data in the storage unit 208. Although a configuration having the full-color image correction unit 403 and the single-color image correction unit 404 is described in the present embodiment, the two units may be combined to form a streak image correction unit. When the single streak image correction unit is used, the reading image processing part 207 sequentially stores the image data in which the single-color streak image correction has been performed and the image data in which the full-color streak image correction has been performed in the storage unit 208.

<Character Recognition Comparison>

The character recognition processing part 209 performs the character recognition processing for each of the image data, which are stored in the storage unit 208, i.e., the image data after the full-color streak image correction and the image data after the single-color streak image correction. The character recognition processing part 209 compares each character recognition result and determines the image data to be finally output. Hereinafter, the image data after the full-color streak image correction is referred to as "first image data", and the image data after the single-color streak image correction is referred to as "second image data".

Figure 11:
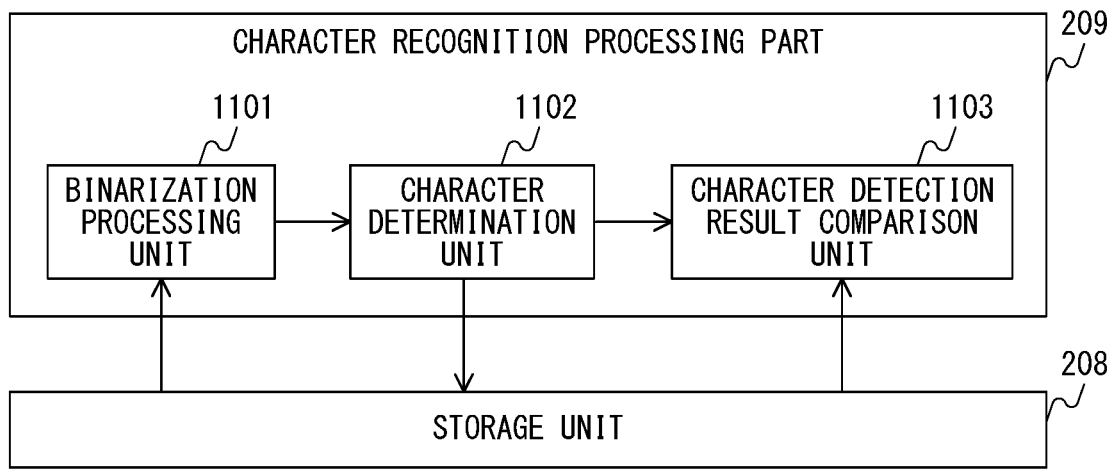
FIG. 11 is a configuration diagram of a character recognition processing unit.

FIG. 11 is a configuration explanatory diagram of the character recognition processing part 209. The character recognition processing part 209 includes a binarization processing unit 1101, a character determination unit 1102, and a character detection result comparison unit 1103.

Figure 12:
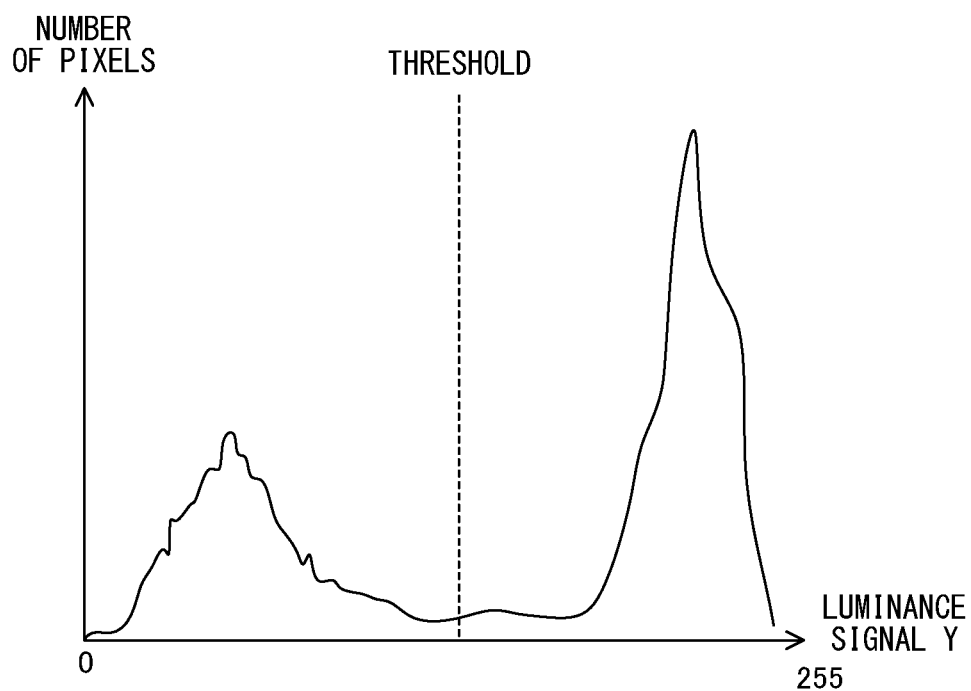
FIG. 12 is an explanatory diagram of a histogram.

The binarization processing unit 1101 reads the first image data from the storage unit 208 and performs the binarization processing on the first image data. The binarization processing unit 1101 converts the first image data from RGB color space to YCbCr color space for the binarization processing. The binarization processing unit 1101 obtains a histogram by plotting the number of pixels of the luminance signal Y (yellow) for each luminance value from 0 to 255 from the first image data converted into the YCbCr color space. FIG. 12 is an exemplary diagram of such a histogram. The binarization processing unit 1101 sets, for the histogram, a threshold value so as to separate a bright signal and a dark signal. For example, the binarization processing unit 1101 binarizes the first image data by setting "0" for a luminance value below the threshold value and setting "255" for a luminance value above the threshold value to "255". The binarization processing unit 1101 transmits the binarized first image data to the character determination unit 1102. The character determination unit 1102 extracts a character from the binarized first image data obtained from the binarization processing unit 1101 by a character recognition process to store a character code of the extracted character in the storage unit 208. The character recognition process is performed by, for example, an OCR (Optical Character Recognition) process.

The binarization processing unit 1101 and the character determination unit 1102 also perform the binarization processing and the character recognition process for the second image data, as in the first image data. Thereby, the character determination unit 1102 stores the character code of the character extracted from the second image data in the storage unit 208.

The binarization method is not limited to the above method as long as the RGB image is binarized and converted into data that can be recognized as characters. Further, the character recognition method may be any method as long as the characters can be determined.

Figure 13A:
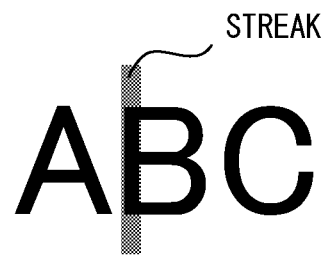
FIG. 13A, FIG. 13B, and FIG. 13C are explanatory diagrams of the character recognition processing with the streak image correction.
Figure 13B:
Figure 13C:

The character detection result comparison unit 1103 compares the character code obtained from the first image data with the character code obtained from the second image data. FIGS. 13A to 13C are explanatory diagrams of character recognition results. FIG. 13A is a diagram in a case where the streak image generated by the dust adhering to the reading position of the R sensor 502 affects a part of a character "B" in a character string "ABC". In a case where such a reading image is corrected by the full-color image correction unit 403 to perform the character recognition process, the character string may be erroneously recognized as "A3C", as shown in FIG. 13B. In a case where the reading image is corrected by the single-color image correction unit 404 and then the character recognition is performed, the color of the character changes and becomes chromatic color, however, as shown in FIG. 13C, the character string "ABC" can be recognized.

The character detection result comparison unit 1103 compares the character code obtained from the first image data with the character code obtained from the second image data. Based on the results, it determines whether the character codes match or not. The character detection result comparison unit 1103 transmits the detection result to the CPU 202. In a case where the character codes match, the CPU 202 selects, as the image data of the final output image, the first image data to which the full-color streak image correction has been performed by the full-color image correction unit 403. In a case where the character codes do not match, the CPU 202 selects, as the image data of the final output image, the second image data to which the single-color streak image correction has been performed by the single-color image correction unit 404.

<Image Reading Processing>

Figure 14:
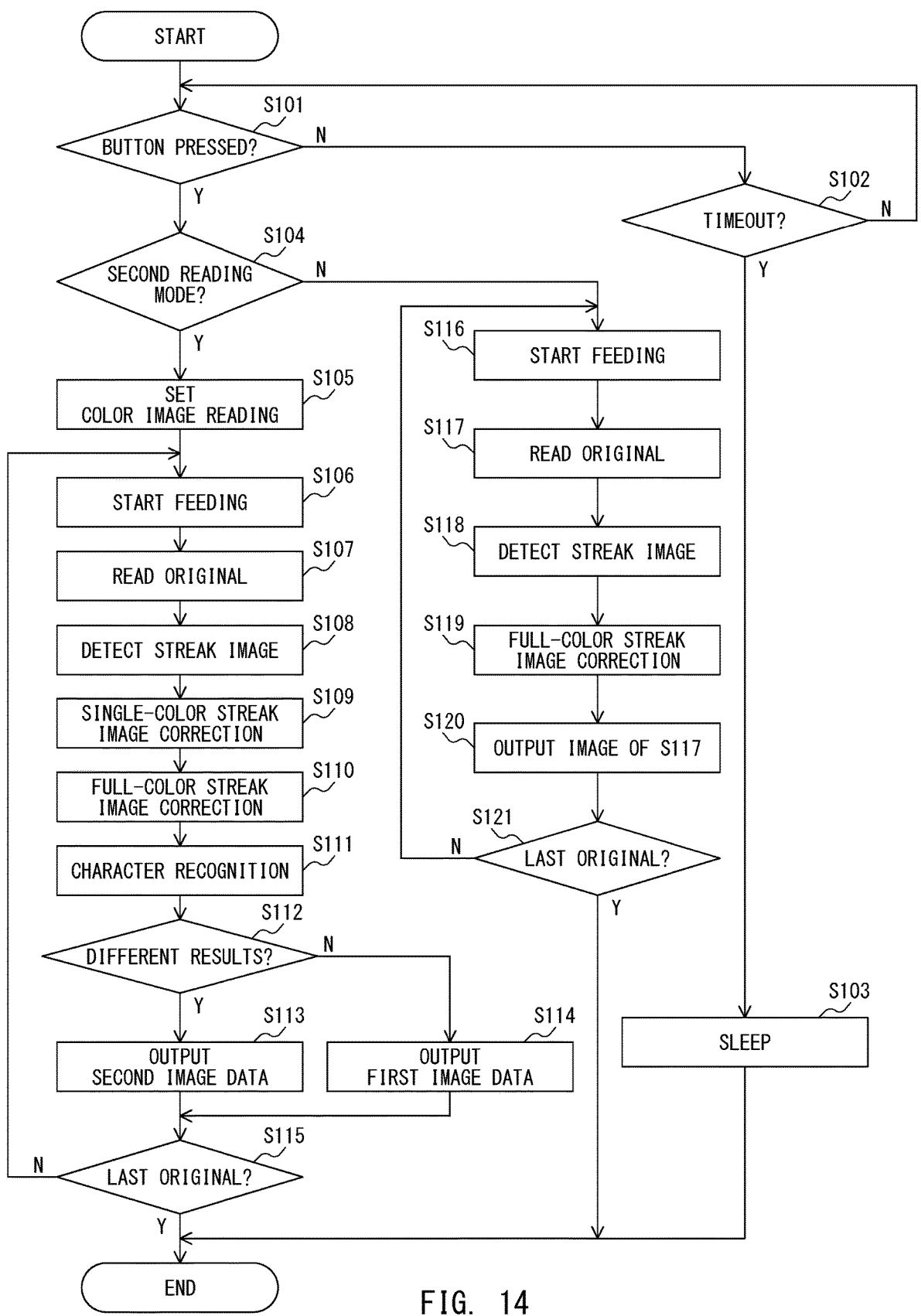
FIG. 14 is a flow chart representing image reading processing with a streak image correction.

FIG. 14 is a flow chart representing the image reading processing including the streak image correction by the image reading apparatus 100 having the above configuration. The image reading apparatus 100 can operate in two reading modes, e.g., a first reading mode and a second reading mode. The first reading mode is a reading mode in which the streak image correction of full-color is performed by suppressing a change in color, for example, when reading an image for copy output. The second reading mode is a reading mode in which the streak image correction is performed while avoiding the loss of character information, as in the case of reading an image such as a form.

The CPU 202 determines whether or not the user pressed the image reading start button provided on the operation panel 201 (STEP S101). The CPU 202 makes the above determination based on whether or not a signal transmitted from the operation panel 201 is obtained when the image reading start button is pressed. When the image reading start button is not pressed (STEP S101: N), the CPU 202 determines whether or not the predetermined time has elapsed without pressing the image reading start button and the timeout has occurred (STEP S102). If the timeout has not occurred (STEP S102: N), the CPU 202 returns to the process of STEP S101 and determines whether the image reading start button has been pressed again. When the time-out has occurred (STEP S102: Y), the CPU 202 controls the image reading apparatus 100 to enter a sleep state in which the power consumption is lower than usual, and ends the processing (STEP S103).

In a case where the image reading start button is pressed (STEP S101: Y), the CPU 202 determines whether or not the second reading mode is selected (STEP S104). The reading mode is set through the operation panel 201, for example, before the image reading start button is pressed. For example, the user sets the first reading mode at the time of copying, and sets the second reading mode at the time of digitizing a form.

In a case where the second reading mode is selected (STEP S104: Y), the CPU 202 sets the image reading apparatus 100 (color line sensor 125) to perform the image reading in color mode (STEP S105). Then, the CPU 202 drives the original conveyance motor 205 to start feeding the original 103 (STEP S106). The CPU 202 turns on the lamps 119 and 120 when the original detection sensor 127 detects the original 103 during conveying the same, then, the CPU 202 starts the reading operation using the color line sensor 125 (STEP S107). The reading operation is started before the original 103 reaches the reading position. That is, the color line sensor 125 reads the white guide member 114 before the original 103 reaches the reading position, then, the color line sensor 125 reads the image of the original 103 when the original reaches the reading position. The CPU 202 detects the above-mentioned streak image by the reading image processing part 207 based on the respective reading data of the white guide member 114 and the original 103 (STEP S108). By the streak image detection, all color the streak image information is stored in the position storing unit 402.

When the image of the original 103 is read, as to the reading data of the original 103, the CPU 202 performs the single-color streak image correction for only the color for which the streak image is detected (STEP S109). This correction is performed by using the single-color image correction unit 404 and based on the full-color streak image information stored in the position storing unit 402. The reading data after the single-color streak image correction is stored in the storage unit 208 as the second image data. Further, as to the reading data of the original 103, the CPU 202 performs the full-color streak image correction for full-color for which the streak image is detected (STEP S110). This correction is performed by using the full-color image correction unit 403 and based on the full-color streak image information stored in the position storing unit 402. The reading data after the full-color streak image correction is stored in the storage unit 208 as the first image data.

The CPU 202 performs the character recognition process of the second image data generated in the process of S109 and the first image data generated in the process of STEP S110 by the character recognition processing part 209 (STEP S111). As a result of the character recognition process, the character codes of the second image data and the first image data are stored in the storage unit 208, respectively. The CPU 202 compares the character code obtained from the second image data with the character code obtained from the first image data by the character detection result comparison unit 1103 (STEP S112).

As a result of the comparison, when the character codes are different from each other (STEP S112: Y), the CPU 202 determines the second image data generated by the single-color streak image correction as the image data to be finally output to output the same (STEP S113). As a result of the comparison, when the character codes are the same (STEP S112: N), the CPU 202 determines the first image data generated by the full-color streak image correction as the image data to be finally output and outputs the same (STEP S114).

After outputting the image data, the CPU 202 determines whether or not the original 103 from which the image is read is the last original (STEP S115). For example, a sensor for detecting the presence or absence of the original on the original tray 104 is provided in the original tray, and the determination of the last original is performed based on the detection result of this sensor. In a case where the read original 103 is not the last original (STEP S115: N), the CPU 202 returns to the process of STEP S106 and feeds the next original to read the image. When the original 103 is the last original (STEP S115: Y), the CPU 202 ends the process.

When the second reading mode is not selected as the reading mode (STEP S104: N), the CPU 202 operates in the first reading mode. In the first reading mode, setting of the color/monochrome reading is performed by a user. The CPU 202 feeds the original 103 to read an image from the original 103 being conveyed (STEP S116, STEP S117). The CPU 202 detects the streak image based on the respective reading data of the white guide member 114 and the original 103 (STEP S108). The processing from the feeding start of the original 103 to the detection of the streak image is the same as the process of STEPs S106-S108.

The CPU 202 performs the full-color streak image correction by the full-color image correction unit 403 after reading the image of the original (STEP S119). The full-color streak image correction process is the same as the process of STEP S110. In the first reading mode, the streak image correction for all colors is always performed to prevent the achromatic original image from changing to the chromatic color reading image. The CPU 202 determines the second image data generated by the full-color streak image correction as the image data to be finally output and outputs the same (STEP S120). The printer 200 forms an image on the sheet based on the output image data.

After that, the CPU 202 determines whether or not the original 103 from which the image is read is the last original (STEP S121). In a case where the read original 103 is not the last original (STEP S121: N), the CPU 202 returns to the processing of STEP S116 and feeds the next original to read the image. In a case where the original 103 is the last original (STEP S121: Y), the CPU 202 ends the process.

The image reading apparatus 100 described above can appropriately correct the streak image caused by the foreign matter even when the foreign matter such as the dust is on the platen 118. As a result, the image reading apparatus 100 can perform image reading with reducing risk of rewriting characters and suppressing unnecessary coloring of the read image. In this way, the streak image can be appropriately corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-036929, filed Mar. 9, 2021, which is hereby incorporated by reference herein in its entirety.

What is claimed is:

1. An image reading apparatus comprising:
a conveyance unit configured to convey an original;
a reading unit comprising a reading sensor, the reading sensor having a light receiving element to receive light of a first color and a light receiving element to receive light of a second color that is different from the first color, wherein the reading unit is configured to read an image of the original conveyed by the conveyance unit by using the reading sensor to generate image data which represents a reading result of the reading unit;
at least one processor configured to:
determine a first abnormal position that is a position in a first direction of an abnormal pixel of the first color in an image represented by the image data, wherein, in the image represented by the image data, the first direction is a direction which intersects a second direction corresponding to a conveyance direction in which the original is conveyed;
determine a second abnormal position that is a position in the first direction of an abnormal pixel of the second color in the image represented by the image data;
perform correction processing for removing the streak image by correcting the image data; and
perform character recognition processing to recognize a character in the image represented by the image data,
wherein the at least one processor is configured to perform a first processing in which:
the correction processing is performed to the image data of the first color corresponding to the first abnormal position in the image represented by the image data; and
the correction processing is performed, regardless of presence or absence of the abnormal pixel of the second color, to the image data of the second color corresponding to the first abnormal position in the image represented by the image data,
wherein the at least one processor is configured to perform a second processing in which:
the correction processing is performed to the image data of the first color corresponding to the first abnormal position in the image represented by the image data; and
the correction processing is not performed, in a case where the abnormal pixel of the second color is not in the first abnormal position, to the image data of the second color corresponding to the first abnormal position in the image represented by the image, and
wherein the at least one processor is configured to:
output an image obtained by the first processing in a case where the character recognized by the character recognition processing to the image obtained by the first processing and the character recognized by the character recognition processing to the image obtained by the second processing are the same,
output an image obtained by the second processing in a case where the character recognized by the character recognition processing to the image obtained by the first processing and the character recognized by the character recognition processing to the image obtained by the second processing are different from each other.

2. The image reading apparatus according to claim 1, wherein the at least one processor is configured to binarize image data corresponding to the image obtained by the first processing and image data corresponding to the image obtained by the second processing, respectively, and
wherein the at least one processor is configured to recognize a character in the binarized image data.

3. The image reading apparatus according to claim 1, wherein the at least one processor is configured to recognize the character by an OCR.

4. The image reading apparatus according to claim 1, wherein the reading unit is configured to read the image of the original passing through a reading position on a transparent member through the transparent member;
wherein the image reading apparatus includes a white member arranged at a side opposite to the reading unit with respect to the transparent member at the reading position; and
wherein the at least one processor is configured to determine the first abnormal position and the second abnormal position based on a result of reading the white member by the reading unit and a result of reading the image of the original.

5. The image reading apparatus according to claim 1, wherein the correction processing is processing of correcting the image data to be corrected by using image data corresponding to a pixel adjacent to a pixel corresponding to the image data to be corrected in the first direction.

* * * * *